United States Patent Office 3,352,107
Patented Nov. 14, 1967

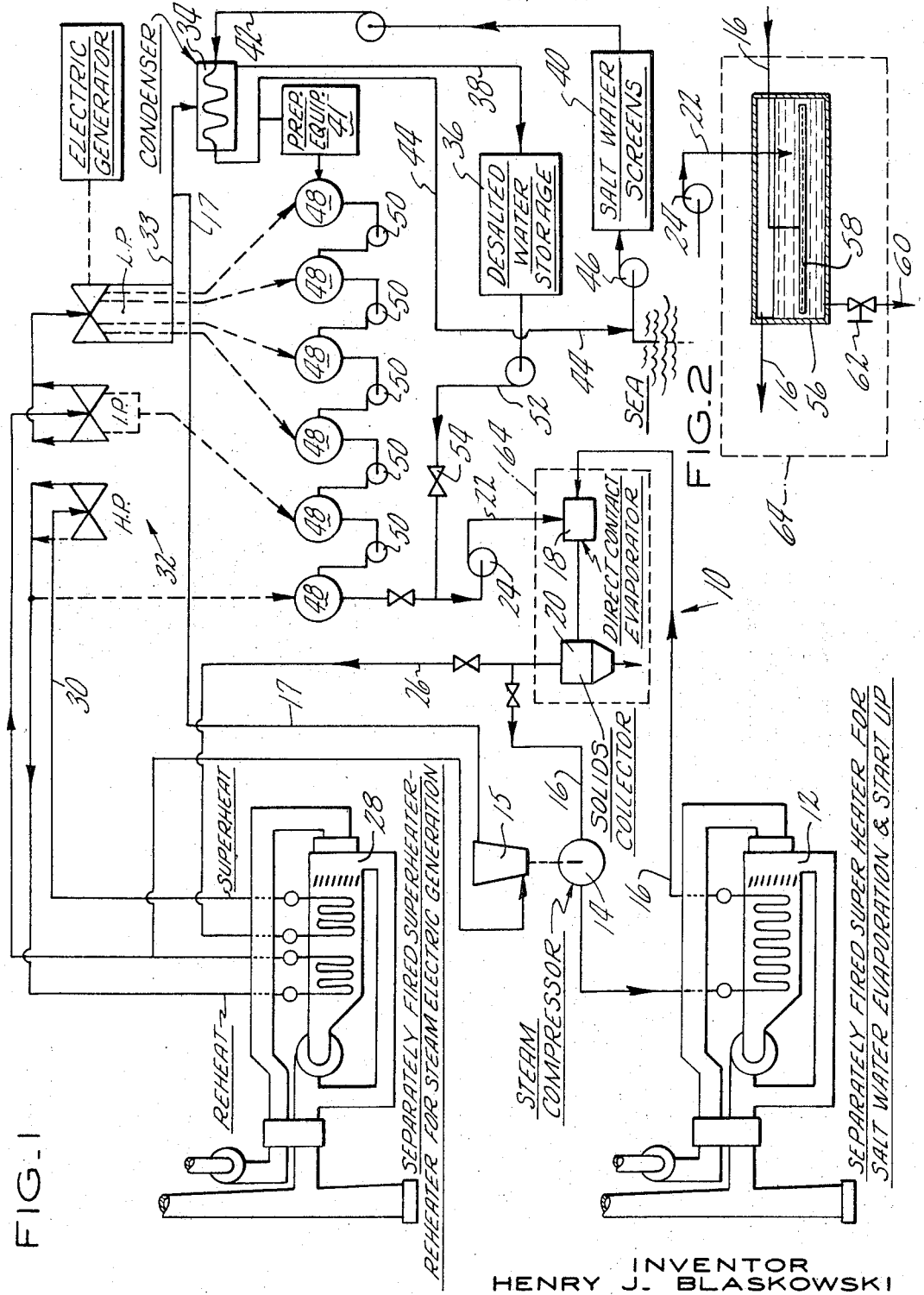

3,352,107
DESALINATION AND POWER GENERATING SYSTEM
Henry J. Blaskowski, Simsbury, Conn., assignor to Combustion Engineering, Inc., Windsor, Conn., a corporation of Delaware
Filed Dec. 17, 1965, Ser. No. 514,581
13 Claims. (Cl. 60—64)

This invention relates generally to a system utilizing the vaporization principle to produce potable water from a contaminated water source such as salt water and has particular relation to such a system having incorporated therein a power generating facility with the entire system having a heat rate comparing favorably with modern steam operated power plants. The invention will be herein described with relation to generating power and producing potable water from a saline water source. However, it is to be understood that the invention is equally well applicable to the production of potable water from sources of contaminated supply other than saline water with the invention being capable of producing potable water from a variety of contaminated water sources.

The system of the invention operates on the regenerative cycle so as to provide a favorable heat rate and in accordance with the invention, there is provided a steam circulating system with this system including a compressor for forcing the steam through the system, a superheater and means downstream of the superheater relative to the circulating steam flow wherein preheated saline water is brought into direct contact with the circulating steam with at least a portion of this saline feed being vaporized and with the contaminants being removed. In one embodiment of the invention the saline feed is sprayed into the circulating steam and the solid contaminants thus entrained in the steam with the steam passing through a gas-solids separator to remove these contaminants. In another embodiment of the invention the circulating superheated steam is introduced into a body of the saline feed so that a portion of the feed is evaporated and a concentrated salt solution produced which is continuously blown down or conveyed to waste. The steam produced by vaporization of the saline feed is preferably superheated and conveyed to a power system operating on the regenerative, and preferably the reheat, cycle and which includes a turbine machine as the prime mover. The exhaust from the turbine is conveyed through a condenser with this condensate providing a potable water supply. The system operates with 100 percent makeup and the saline feed is conveyed through the condenser as part of the condensing medium. Thereafter the saline feed is conveyed through a series of heaters which receive as their heating medium steam bled from the turbine. This steam is introduced into the saline feed to heat and dilute the same. Further dilution of the saline feed may be provided by introducing thereinto some of the condensate.

Accordingly, it is the object of this invention to provide an improved desalination and power generating system.

Other and further objects of the invention will become apparent to those skilled in the art as the description proceeds.

With the aforementioned object in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein:

FIG. 1 is a diagrammatic representation of one embodiment of the invention; and

FIG. 2 represents a modification of the system of FIG. 1 wherein the equipment within the dotted line area of FIG. 1 is replaced by that illustrated in FIG. 2.

Referring now to the drawings, wherein like reference characters are used throughout to designate like elements, the illustrative and preferred embodiment of the invention, particularly shown in FIG. 1, includes a steam circulating system designated generally 10 and including the fuel fired superheater 12 and compressor 14. The compressor is effective to circulate the steam through the conduit 16 of the circulating system with the compressor forcing the steam through the superheater 12 and then through the desuperheater or direct contact evaporator 18. From this evaporator the steam is conveyed through the gas-solids separator 20 and then back to the inlet of the compressor.

Saline water is introduced into the evaporator 18 through conduit 22 from feed pump 24. This saline feed is sprayed into the evaporator and is flashed into steam upon contacting the superheated circulated steam in the circulating system 10. The quantity of saline feed introduced into the evaporator is such that the stream of steam egressing from the evaporator is slightly superheated so that the salt entrained therein is in a dry condition. This salt is separated from the steam in the separator 20. Steam is conveyed from the circulating system 10 through the conduit 26 with the quantity of steam passing through this conduit being generally equal to that produced through vaporization of the saline feed. This steam is superheated in the fuel fired steam heater 28 and the thus superheated steam is conveyed through conduit 30 to the high pressure stage of the multi-stage turbine 32. In the illustrative arrangement the reheat cycle is employed with the exhaust from the high pressure turbine stage being reheated in the heater 28 and conveyed to the intermediate pressure stage and then finally to the low pressure stage of the turbine. The exhaust from this low pressure stage is conveyed through conduit 33 to the condenser 34 where it is condensed to produce potable water with this water being conveyed to a storage area 36 through conduit 38.

The system of the invention utilizes 100 percent makeup water and in order to achieve the most favorable heat rate possible, the regenerative cycle is utilized and the saline feed is conveyed through the condenser 34 in indirect heat exchange relation with the exhaust from the low pressure turbine stage. This saline feed forms only a part of the necessary condensing medium and as illustrated, saline water is pumped via pump 46 from the source (sea) through suitable screens 40 and conduit 42 to and through the condenser 34. The excess water over and above that necessary for the saline feed to be supplied to the circulating system 10 is directed back to the source through conduit 44. The saline feed is conveyed through additional preparation equipment 41 to a series of open heaters 48, these heaters receiving as their heating medium steam which is passed through at least a portion of the turbine 32. These heaters are direct contact heaters and are in the form of relatively large tanks into which the steam is introduced directly into the saline feed with the feed being pumped from one tank to another via the pumps 50. These direct contact heaters are effective to heat the saline feed as well as dilute the feed by the amount of condensate added through condensing of the steam introduced into the heaters. Additional dilution of the feed may be provided, if desired, through the conduit 52 which extends from the purified water storage area 36 to the inlet of pump 24 and is controlled by valve 54. It is preferred to drive the compressor 14 by means of a turbine 15 with this turbine receiving its steam input, in the illustrative arrangement, from the reheat line leading from the heater 28 to the turbine 32 although it will be understood that the supply may be taken from any point in the system that is desired. The exhaust from the turbine is conveyed through conduit 17 to conduit 32 and thence to condenser 34. The turbine drive 15 will be utilized after operation of the system has been initiated so that steam is available for the drive. It may also be utilized for startup providing there is an auxiliary or supplementary steam supply. Otherwise, an electric motor drive for starting purposes will be provided.

With this steam producing and power generating system a very favorable heat rate is obtained and a continuous supply of potable water produced. The heat rate compares very favorably with that achieved with modern steam power plant systems. Thus, in effect, a supply of potable water is produced and at a minimum fuel cost.

The system of FIG. 2 is similar to that of the previously described FIG. 1 arrangement with the exception of the way in which steam is produced from the saline feed in the circulating system. In the arrangement of FIG. 2 the system components illustrated in this figure are substituted for those contained within the dotted line area 64 of FIG. 1 to provide a modification of the system of FIG. 1. In this modified arrangement there is incorporated into the circulating system a tank 56 into which the saline feed is introduced via conduit 22 and pump 24 with there being maintained in this tank 56 a quantity of liquid such as to provide a predetermined liquid level in the tank. The circulating steam is introduced into the tank below the liquid level thereof via the distributor 58 which communicates with the conduit 16. The liquid in tank 56 is a very concentrated salt solution continuously varying between saturated and slightly supersaturated such that salt is continuously precipitated from the solution. A continuous blowdown is provided through the blowdown conduit 60 controlled by the valve 62. The steam that is produced in the tank or drum 56 is conveyed therefrom via the conduit 16 and since there is little entrained solids in this steam, there is no need for the gas-solids separator in the circulating system of this embodiment. The quantity of steam produced in the tank or drum 56 as the result of vaporozation of the saline feed is conveyed from the circulating system through the conduit 26 and through the power generating system previously described.

It will thus be apparent that with the system of the present invention an effective and highly efficient arrangement is achieved for generating power and producing potable water from a contaminated source.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In a water purification and power generating system the combination comprising a steam circulating system including a steam superheating means, a direct contact evaporator and a gas-solids separating means interconnected in series relation with regard to steam flow, means for circulating steam through said circulating system, means to introduce contaminated water into said direct contact evaporator for evaporation therein, means to withdraw from said circulating system a quantity of steam generally equal to that produced in said direct contact evaporator and at a location downstream with regard to steam flow of said separator, additional superheating means through which said thus withdrawn steam is conveyed, a steam operated prime mover connected with the outlet of this last-mentioned superheating means, condenser means receiving the steam exhausted from said prime mover to condense the same to produce potable water, means supplying the contaminated water prior to its introduction into said direct contact evaporator as at least part of the coolant medium for said condenser and means for heating this contaminated water subsequent to its passage through the condenser and prior to its introduction into said direct contact evaporator, this last-named means including means for introducing steam from said prime moved directly into said contaminated water.

2. The water purification and power generating system of claim 1 wherein a steam turbine drive is provided for the means for circulating steam through said circulating system, said turbine drive being provided with steam which has traversed said other superheating means and means for directing the exhaust from said turbine drive to said condenser.

3. The system comprising in combination a steam generator including a steam circulating system comprising a steam heater, means forming part of said circulating system and located downstream of said steam heater operative to convert contaminated feedwater to steam free of contamination, means for removing the steam produced from said contaminated feedwater from the circulating system steam in a quantity generally equal to that produced by the vaporization of said feedwater, means for superheating said withdrawn steam, a prime mover operatively connected to receive the thus superheated steam as its driving medium, means for condensing the exhaust from said prime mover and to convey it to a desired point of use, means for introducing feedwater into said means where the feedwater is contacted directly by the circulating steam and at least a portion of the feedwater is vaporized, means for conveying said feedwater to said condensing means as at least part of said condensing medium and where the feedwater is conveyed in indirect heat exchange relation with the exhaust from said prime mover, and a plurality of open heaters through which said feedwater flows in series relation after traversing said condensing means and means for conveying steam from said prime moved to said open heaters as the heating medium therefor and where said steam is introduced directly into said feedwater.

4. A water purification and power generating system comprising in combination a steam generating organization including a steam circulating system having means for circulating steam therethrough, means for superheating said circulating steam and means for producing steam free of contaminants by introducing contaminated water into direct contact with said thus superheated steam, a power utilization system including a prime mover receiving steam from said circulating system, means to condense the exhaust steam from said prime mover and to convey it to a point of use, means for introducing the contaminated feedwater into said condenser as at least part of the condensing medium therefor prior to the feedwater being introduced into direct contact with the circulating steam.

5. A water purification and power generating system of claim 4 including regenerated heating means for said feedwater comprising a plurality of heaters in series relation with respect to said feedwater flow, means for directing said feedwater from said condenser through said heaters and means for conveying steam from said prime mover to said heaters as the heating medium therefor with this last-named means directing said steam directly into said feedwater to heat and dilute said feedwater.

6. The water purification and power generating system of claim 4 wherein a steam operated turbine is utilized to circulate steam through the steam circulating system, said turbine receiving its steam from said circulating system with the exhaust from said turbine being conveyed to said condenser.

7. The water purification and power generating system of claim 4 wherein said circulating system includes a gas-solids separating means and wherein said contaminated water is sprayed into the superheating steam in said circulating system.

8. The water purification and power generating system of claim 4 wherein the means for directly contacting the superheated steam in the circulating system and the contaminated feedwater comprises a vessel within which there is contained a body of contaminated feedwater and means for removing water from the lower region of said vessel.

9. The process comprising establishing a circulation of steam, imparting heat to said steam at a predetermined location to superheat the same, contacting the thus superheated steam directly with contaminated feedwater and evaporating at least a portion of said feedwater and producing uncontaminated steam, conveying steam from said circulating system in a quantity generally equal to that produced by evaporation of said feedwater, imparting heat to this steam and utilizing a portion of the energy thereof to do useful work, thereafter condensing this steam and conveying the water to a point of use, effecting the condensing of this steam at least in part by conveying the same in indirect heat exchange relation with the contaminated feedwater prior to its contact with said circulating steam.

10. The process of claim 9 wherein the regenerative cycle is utilized and including the steps of conveying the contaminated feedwater after its utilization for condensing said steam into direct heat exchange relation with steam which has had a portion of its energy utilized to do useful work to thereby heat and dilute said contaminated feedwater prior to its contact with said circulating steam.

11. The process of claim 9 wherein said contaminated feedwater is sprayed into said superheated circulating steam such that the feedwater is flashed into steam and the contaminants are entrained in the steam, thereafter separating said contaminants from said steam while the temperature thereof is above the saturation temperature.

12. The process of claim 9 wherein said superheated steam is contacted by contaminated feedwater through the retaining of a body of said contaminated water, injecting said steam into said body of contaminated feedwater such that a portion of the contaminated feedwater is evaporated and removes a portion of the water from said body to decrease the concentration of contaminants therein.

13. The process of claim 9 wherein said contaminated feedwater is saline water and wherein said superheated circulating steam is contacted by the saline water through the maintaining of a body of said saline water and introducing said superheated steam thereinto so as to evaporate a portion of said water maintaining said body of saline water at least periodically in a supersaturated salt solution and withdrawing water from said body to decrease the concentration therein.

References Cited
UNITED STATES PATENTS 3,207,676  9/1965  Mroz _____ 203—100 X MARTIN P. SCHWADRON, *Primary Examiner.*

ROBERT R. BUNEVICH, *Examiner.*